United States Patent

Hugonnet (10) Patent No.: US 9,217,803 B2
(45) Date of Patent: Dec. 22, 2015

(54) DEVICE AND METHOD FOR ESTIMATING TIME-SHIFTS

(71) Applicant: CGGVERITAS SERVICES SA, Massy (FR)

(72) Inventor: Pierre Hugonnet, Pau (FR)

(73) Assignee: CGGVERITAS SERVICES SA, Massy (FR)

(*) Notice: Subject to any disclaimer, the term of this patent is extended or adjusted under 35 U.S.C. 154(b) by 360 days.

(21) Appl. No.: 13/739,585

(22) Filed: Jan. 11, 2013

(65) Prior Publication Data

US 2013/0182537 A1    Jul. 18, 2013

Related U.S. Application Data

(60) Provisional application No. 61/585,825, filed on Jan. 12, 2012.

(51) Int. Cl.
*G01V 1/36* (2006.01)

(52) U.S. Cl.
CPC .............. *G01V 1/36* (2013.01); *G01V 2210/20* (2013.01); *G01V 2210/53* (2013.01)

(58) Field of Classification Search
CPC .............................. G01V 1/36; G01V 2210/20
USPC .......................................................... 367/51
See application file for complete search history.

(56) References Cited

U.S. PATENT DOCUMENTS

| 5,719,822 A * | 2/1998 | Wang ............................... 367/53 |
| 2009/0168600 A1* | 7/2009 | Moore et al. .................... 367/38 |
| 2010/0067328 A1* | 3/2010 | Curtis .............................. 367/50 |

FOREIGN PATENT DOCUMENTS

| GB | 2402217 A | 12/2004 |
| WO | 9903004 | 1/1999 |
| WO | WO99/03004 | * 1/1999 |

OTHER PUBLICATIONS

Hugonnet P. and Boelle J.-L., "Beyond Aliasing Regularisation by Plane Event Extraction," 69th EAGE Conference & Exhibition, Extended abstract, London, UK, Jun. 11-14, 2007, P144.

Traonmilin Y. and Gulunay N., "Statics Preserving Projection Filtering," 73rd EAGE Conference & Exhibition, Extended abstract, Vienna, Austria, May 23-26, 2011, G011.

(Continued)

*Primary Examiner* — Luke Ratcliffe
(74) *Attorney, Agent, or Firm* — Patent Portfolio Builders PLLC (57) ABSTRACT

Computing device and method for calculating time-shifts associated with travel-times of seismic waves emitted by a source and recorded by plural seismic detectors after reflection from a subsurface structure. The method includes receiving seismic data (d) that includes plural traces related to a subsurface, wherein the seismic data (d) is in a time-space domain; transforming with a processor the seismic data (d) from the time-space domain to a radon domain; picking linear events from the seismic data in the radon domain; calculating the time-shifts associated with the picked linear events; correcting the seismic data (d) based on the time-shifts to obtain new seismic data (d'); and computing an image of the subsurface based on the new seismic data (d'). The time-shifts are calculated per trace and per event.

20 Claims, 12 Drawing Sheets

(56) References Cited

OTHER PUBLICATIONS

Blanco J. and Canadas G., "Wavefield Decomposition by 3-D/3-C Inversion Process in Tau-P Domain," 65th EAGE Conference & Exhibition, Extended Abstracts, Stavenger Norway Jun. 2-5, 2003, P103.

British Search Report mailed Jul. 2, 2013 in related GB Application No. 1300504.6.

* cited by examiner

DEVICE AND METHOD FOR ESTIMATING TIME-SHIFTS

CROSS REFERENCE TO RELATED APPLICATIONS

This application claims priority and benefit from Provisional Patent Application No. 61/585,825, filed Jan. 12, 2012, for "Estimation of Time Shifts Per Event and Per Trace in the Extraction of Multidimensional Linear Events by Parametric Inversion," the entire contents of which are incorporated herein by reference.

BACKGROUND

1. Technical Field

Embodiments of the subject matter disclosed herein generally relate to methods and systems and, more particularly, to mechanisms and techniques for estimating time-shifts per event and per trace in the extraction of multi-dimension linear events.

2. Discussion of the Background

Seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is desired, for example, by those who need to determine where oil and gas reservoirs are located.

Reflection seismology is a method of geophysical exploration to image the subsurface of the earth for determining its properties, which information is especially helpful in the oil and gas industry. Typically, a controlled source sends seismic energy waves into the earth. By measuring the time (travel-time) it takes for the reflections to come back to plural receivers, it is possible to estimate the depth and/or composition of the features causing such reflections. These features may be associated with subterranean hydrocarbon deposits.

Figure 1:
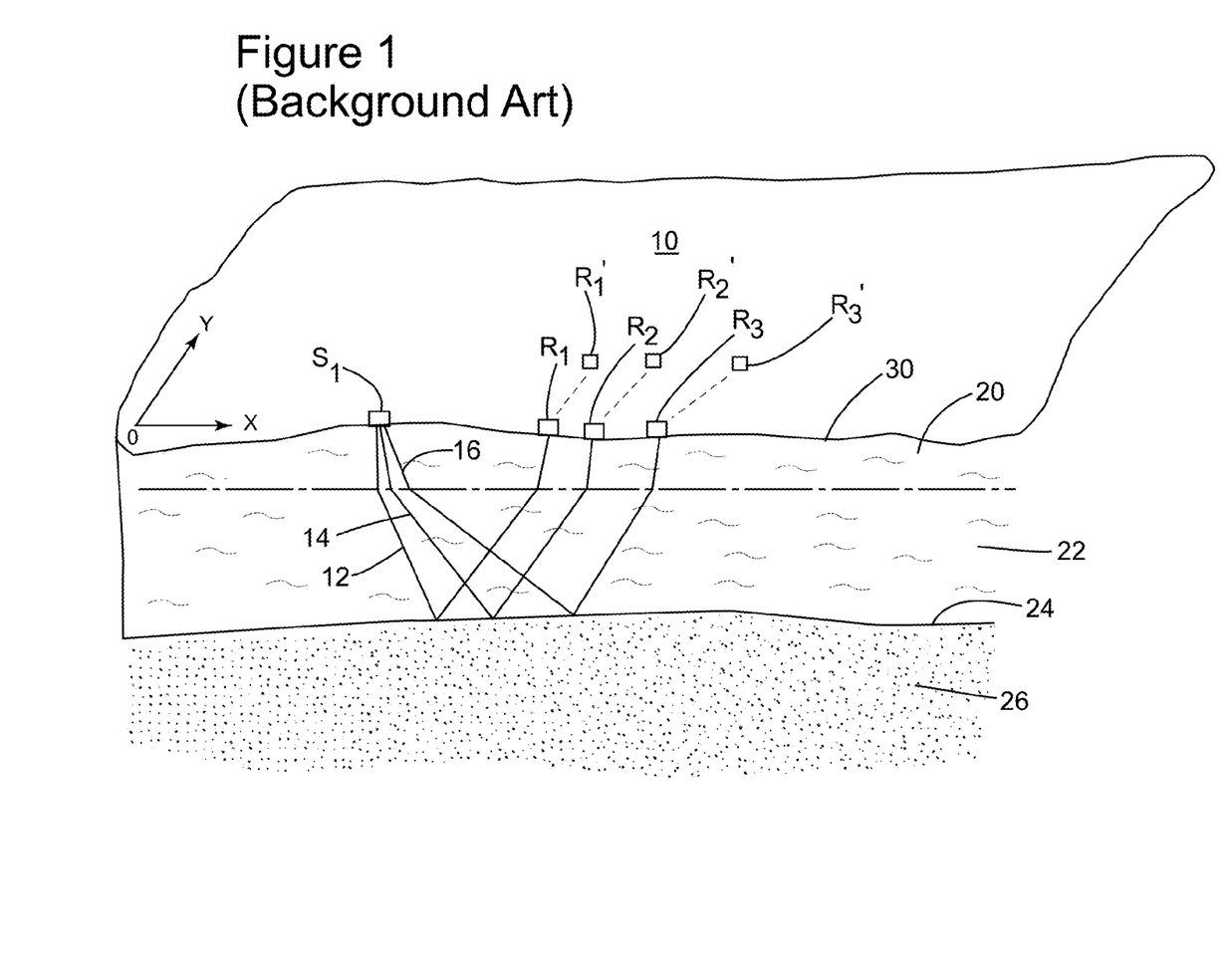
FIG. 1 is a schematic diagram of a conventional onshore seismic data acquisition system.

However, there are certain problems associated with processing the reflections measured by the receivers as discussed now with regard to FIG. 1. FIG. 1 shows a seismic system 10 that includes at least a source $S_1$ and plural receivers $R_1$ to $R_3$. The source $S_1$ emits energy, as waves 12, 14, and 16, that propagates through a surface layer 20 and other layers 22 until is reflected by a structure 24. Part of the energy may also propagate through the structure 24 into further layers 26 until reflected by another structure (not shown). The reflected waves return to the earth surface 30, where the receivers $R_1$ to $R_3$ record them.

However, the near-surface layer 20, i.e., the top-most layer of the earth, often causes significant difficulties for imaging seismic reflection data because this layer, through its irregular thickness and/or velocity structure, causes timing and phase differences between reflection events recorded at neighboring receivers, for example, at receivers distributed along a cross-line direction OY (e.g., $R_1$ and $R_{1'}$). In addition, the near-surface layer promotes source-generated coherent noises which often mask the reflections.

To correct these problems, it is customary in the field to apply time-shifts to the seismic traces to account for transit time for the near-surface layer, which is known in the field as the "static shift approximation." This approximation works well when the seismic travel paths through the near-surface layer, as illustrated in FIG. 1, are near-vertical. Thus, all the travel paths through the near-surface layer are substantially identical and the travel-times are substantially identical.

Figure 2:
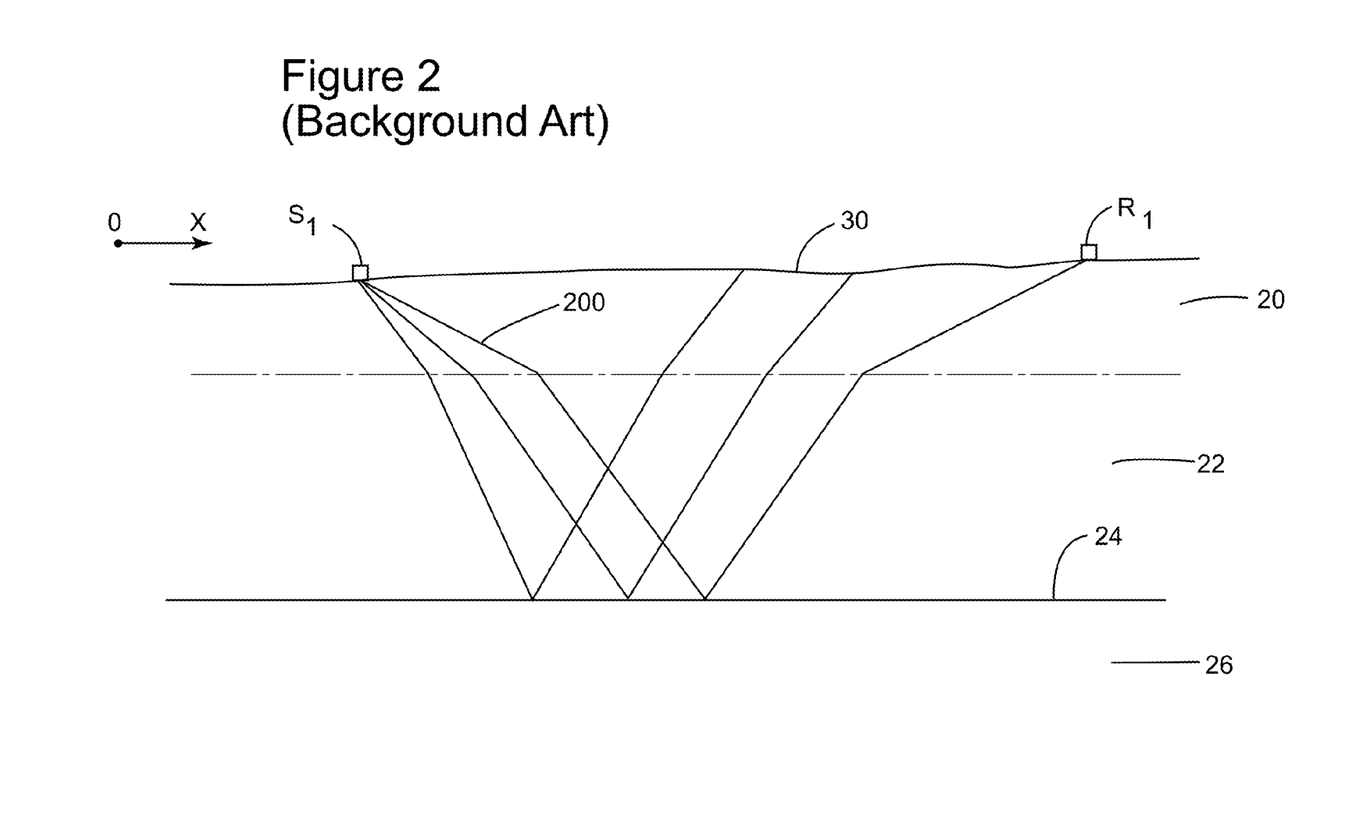
FIG. 2 is a schematic diagram of an onshore seismic data acquisition system.

However, that is not the case for all actual situations. For example, if the near-surface layer has a higher velocity than the underlying layers, and/or the near-surface travel path segments 200 are not vertical and coincident as illustrated in FIG. 2, the traditional static shift approximation does not work. In addition, there may be more than one travel path along which significant seismic energy may travel from the source to the receiver, leading to "multi-path" arrivals. Because the patterns of these arrivals can change from trace to trace, it is clear that applying relative time-shifts, as traditionally performed, cannot address the underlying phenomena.

Thus, there is a need to provide a computing device and a method that estimate and compensate for all the significant arrival delays embedded in each seismic trace.

SUMMARY

According to one exemplary embodiment, there is a method for calculating time-shifts associated with travel-times of seismic waves emitted by a source and recorded by plural seismic detectors after reflection from a subsurface structure. The method includes receiving seismic data (d) that includes plural traces related to a subsurface, wherein the seismic data (d) is in a time-space domain; transforming with a processor the seismic data (d) from the time-space domain to a radon domain; picking linear events from the seismic data in the radon domain; calculating the time-shifts associated with the picked linear events; correcting the seismic data (d) based on the time-shifts to obtain new seismic data (d'); and computing an image of the subsurface based on the new seismic data (d'). The time-shifts are calculated per trace and per event.

In another exemplary embodiment, there is a computing device for calculating time-shifts associated with travel-times of seismic waves emitted by a source and recorded by plural seismic detectors after reflection from a subsurface structure. The computing device includes an interface configured to receive seismic data (d) that includes plural traces related to a subsurface, wherein the seismic data (d) is in a time-space domain; and a processor connected to the interface. The processor is configured to transform the seismic data (d) from the time-space domain to a radon domain; pick linear events from the seismic data in the radon domain; calculate the time-shifts associated with the picked linear events; correct the seismic data (d) based on the time-shifts to obtain new seismic data (d'); and compute an image of the subsurface based on the new seismic data (d'). The time-shifts are calculated per trace and per event.

According to still another exemplary embodiment, there is a non-transitory computer readable medium including computer executable instructions, wherein the instructions, when executed by a processor, implement a method as noted above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, for one spatial variable x. However, the embodiments to be discussed next are not limited to one spatial variable, but may be extended to an arbitrary number of spatial variables, y, z, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for calculating time-shifts associated with travel-times of seismic waves emitted by a source and recorded by plural seismic detectors after reflection from a structure. The method includes a step of receiving seismic data (d) that includes plural traces related to a subsurface, wherein the seismic data is in a time-space domain; a step of transforming, e.g., with a processor, the seismic data (d) from the time-space domain to a radon domain; a step of extracting linear events from the seismic data in the radon domain; a step of calculating the time-shifts associated with the linear events for each trace and for each event; a step of correcting the seismic data (d) based on the time-shifts to obtain new seismic data (d'); and an optional step of computing an image of the subsurface based on the new seismic data (d'). This method is now discussed in more detail.

The seismic processing algorithms that rely on the lateral coherency of the seismic events may lose their effectiveness in the presence of unresolved static shifts because the static shifts destroy the coherency. One traditional approach for addressing this problem incorporates the statics problem into the algorithm itself. For instance, Traonmilin and Gulunay ("Statics Preserving Projection Filtering," 73rd EAGE Conference & Exhibition, Extended abstract, G011, 2011) proposed to simultaneously estimate projection filters and static shifts in order to perform random noise attenuation in the presence of static shifts in the data. A similar approach can be used for other algorithms. Because this approach is not always effective, a new approach is now presented.

The novel approach piggy-backs on an algorithm for extracting local plane events introduced by Hugonnet and Boelle ("Beyond Aliasing Regularisation by Plane Event Extraction," $69^{th}$ EAGE Conference & Exhibition, Extended abstract, P144, 2007). This algorithm is now briefly discussed before introducing the novel approach.

Figure 3:
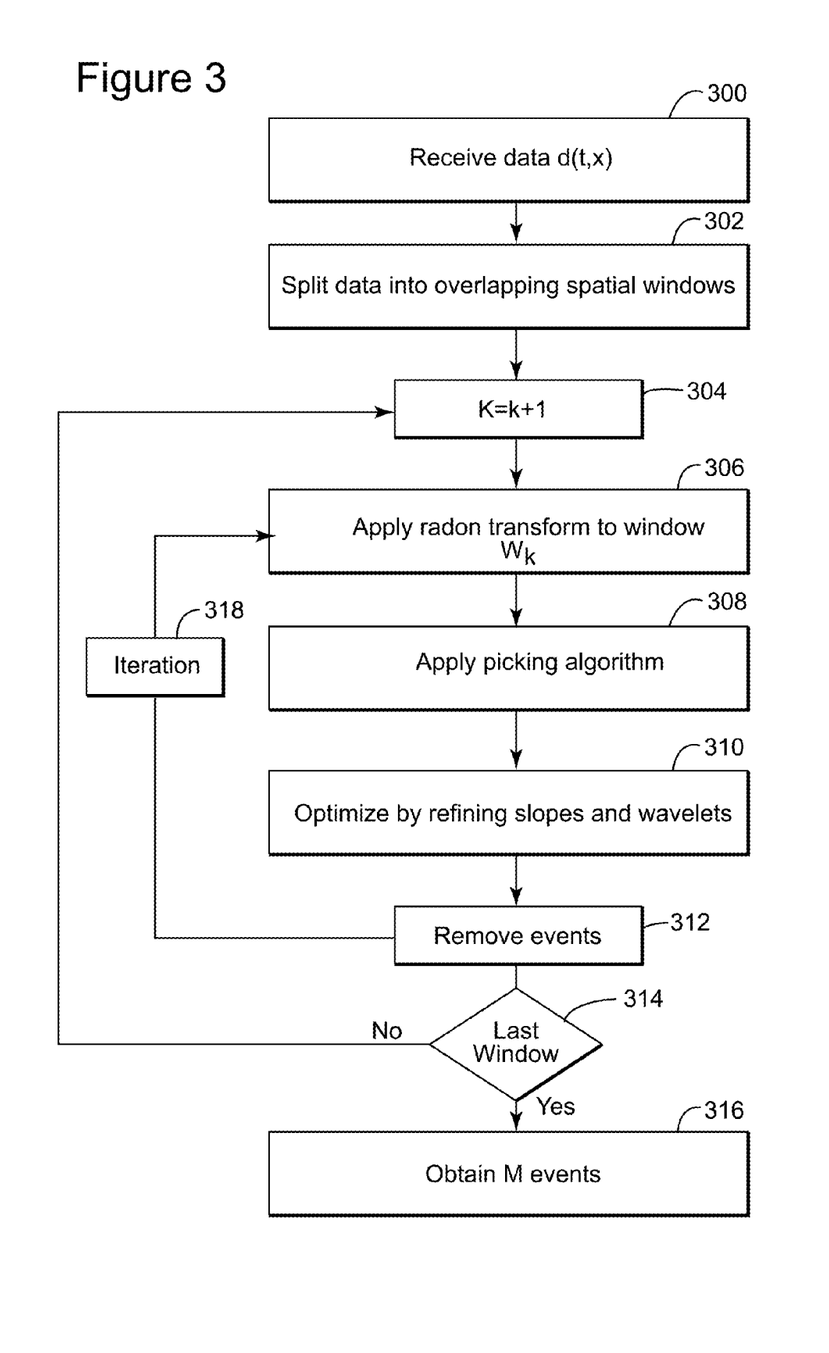
FIG. 3 is a flowchart illustrating a method for extracting events from recorded seismic data.

The local plane event extraction algorithm iteratively extracts, in a two-dimensional (2D) time-space (t, x) domain, linear events of the form:

$$\text{event}(t,x) = S(t - (\tau + p \cdot x)), \quad (1)$$

where t is a time of the event, x is a spatial coordinate of the event, $\tau$ is the intercept time (tau), p is a slope, $t=\tau+p \cdot x$ defines linear shapes (which are also the summation paths in the linear radon transform), and S(t) is a short seismic wavelet that is constant along the event. As discussed earlier, for simplicity purposes, only one spatial variable x is considered herein. However, the algorithm can be extended, as would be recognized by those skilled in the art, to an arbitrary number of variables, e.g., by adding independent terms in the linear radon formulation $t=\tau+p_x \cdot x+p_y \cdot y+ \ldots$ Using the radon transformation, the algorithm is summarized with regard to FIG. 3 as follows. In step 300, data d(t, x) is received to a computing device for processing. In step 302, the data d(t, x) is split into small overlapping spatial windows, which are processed independently of each other. Each window may include i=1 . . . N traces $d(t, x_i)$. In step 306, a window Wk is considered. For each window Wk, a linear radon transform is applied in step 306. While in the radon space (tau-p domain), an automatic intelligent picking algorithm acts in step 308 on the traces and returns a set of j= 1 . . . M events (where M can vary from window to window), each event being characterized by its intercept time (tau), slope (p), and a short wavelet (S) extracted around the pick: ($\tau^{(j)}$, $p^{(j)}$, $S^{(j)}(t)$). The slopes and wavelets may be refined through an optimization process in step 310, so that the extraction of the events leaves minimum energy residuals. The slope and time intercepts and short wavelets may be used to remove, in step 312, the picked events from the initial data d and then a determination is made in this step whether to further pick events and remove them. If the result of this determination is yes, then the method advances to step 318 to reiterate steps 306 to 312 for the residual data r. The algorithm advances to step 314 where it is decided whether more windows need to be processed. If the answer is yes, the algorithm returns to step 304 and processes the next window. Otherwise, the algorithm advances to step 316 which is discussed later. Step 318 is performed as the residual data may contain coherent events that have not been picked because they were masked by more energetic events. The reiteration may be continued until the final residual data contains only noise and no further picking is possible. At the end of the reiteration process, a set of M_total events with accurate slopes and wavelets is obtained in step 312. Further processing steps and a final step 316 of obtaining an image of the surveyed subsurface may be performed.

The optimization process in step 310 is achieved, for example, by applying a non-linear conjugate gradient algorithm (i.e., an algorithm that searches for a local minimum of a non-linear function using its gradient alone) on the following objective function:

$$(p^{(j)}, S^{(j)}) = \arg\min(\Sigma_{i=1\ldots N} \|d(t, x_i) - \Sigma_{j=1\ldots M} S^{(j)}(t-(\tau^{(j)}+p^{(j)} \cdot x_i))\|^2). \quad (2)$$

Once the decomposition of data into M_total events is achieved, the method may filter out some events, based on various criteria, e.g., those with a slope above or below a given threshold. Thus, the criteria may be related to a slope p in the radon domain. However, this method does not take into consideration the time-shifts discussed above.

Figure 4:
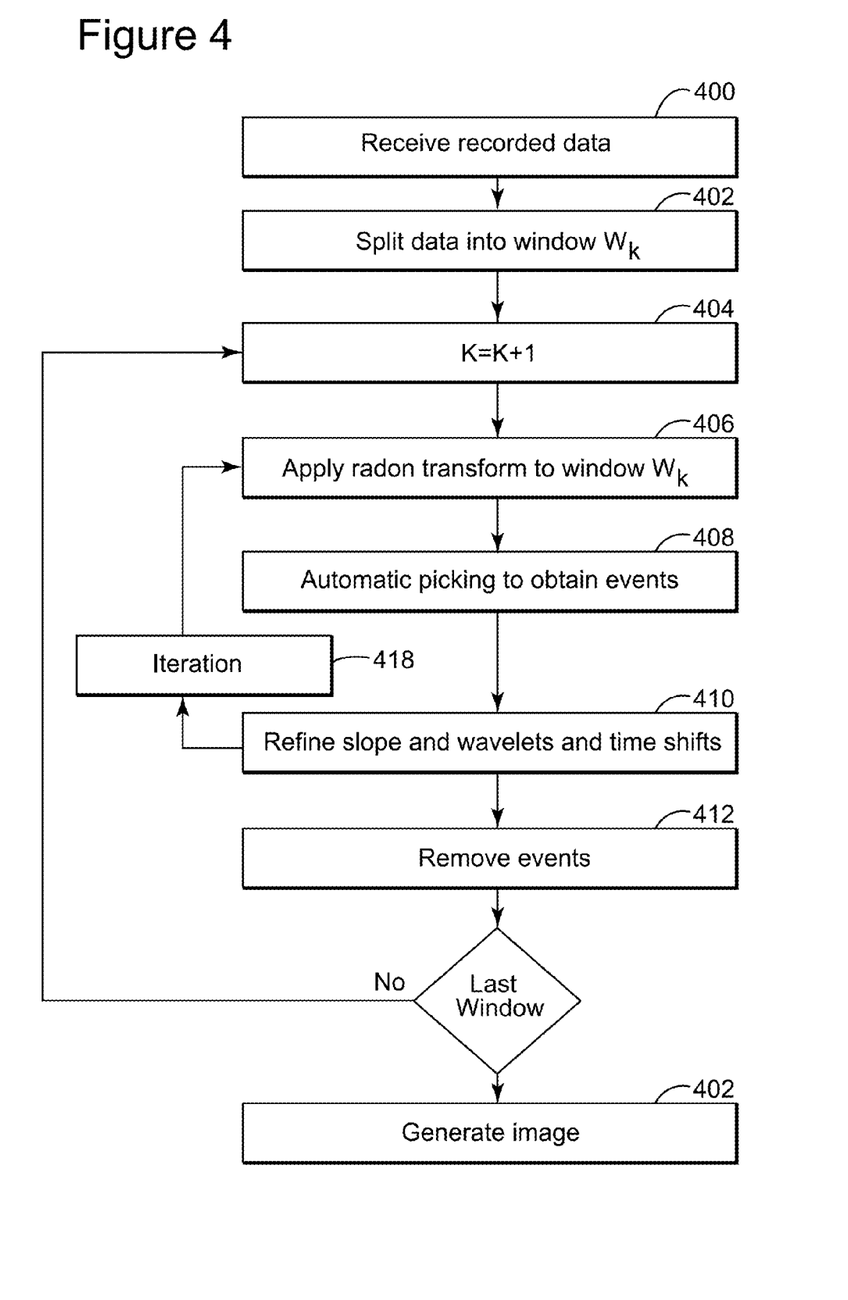
FIG. 4 is a flowchart illustrating a method for determining time-shifts per trace and per event according to an exemplary embodiment.
Figure 5:
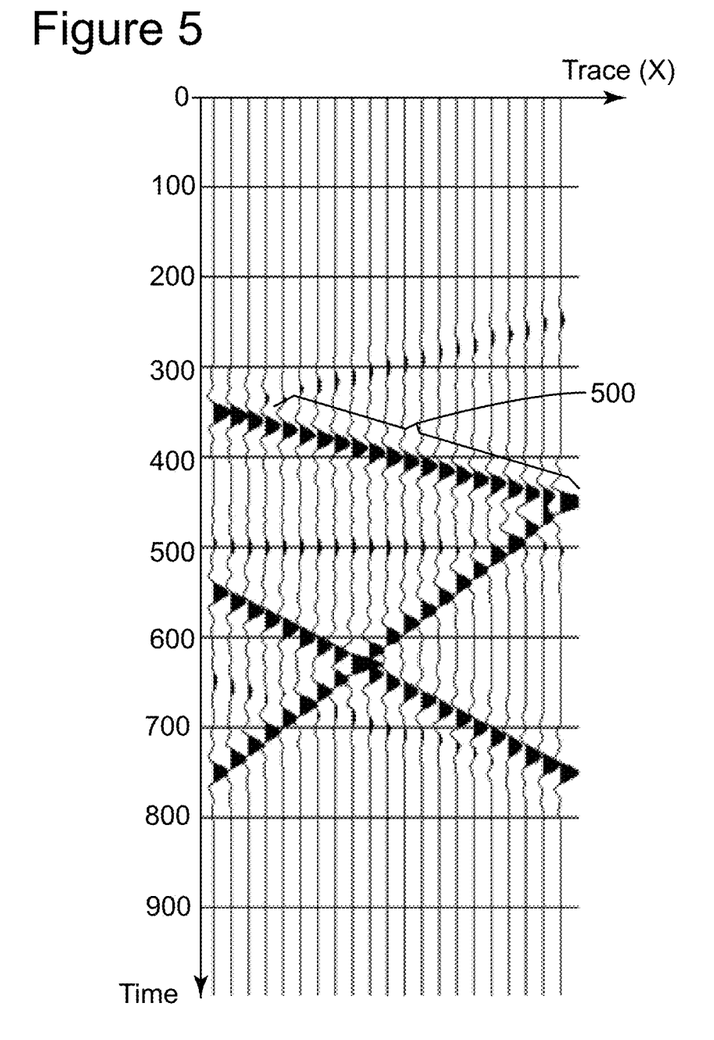
FIG. 5 illustrates a section of a dataset according to an exemplary embodiment.

According to an exemplary embodiment illustrated in FIG. 4, a novel algorithm is now introduced that determines not only the slope and the wavelet for each event, but also a time-shift value $\sigma_i^{(j)}$ for each trace "i" and for each event "j". The steps of this novel method that are similar to the steps of the method illustrated in FIG. 3 are briefly explained. An example of an event 500 is shown in FIG. 5 (FIG. 5 shows one constant-y section of a dataset d(t,x,y)).

The novel method receives recorded seismic data d(t,x) in step 400. The data may be recorded with various devices, e.g., hydrophones, geophones, accelerometers, etc., that are provided in one component and/or multi-component receivers. The data may be recorded during a land or a marine seismic survey. Then, in step 402, the seismic data is split into overlapping windows $W_k$. A window $W_k$ may include i=1 . . . N irregularly distributed traces d(t, $x_i$). The window $W_k$ needs to be small enough to ensure that the seismic events can be approximated by linear events with a constant wavelet.

Figure 6A:
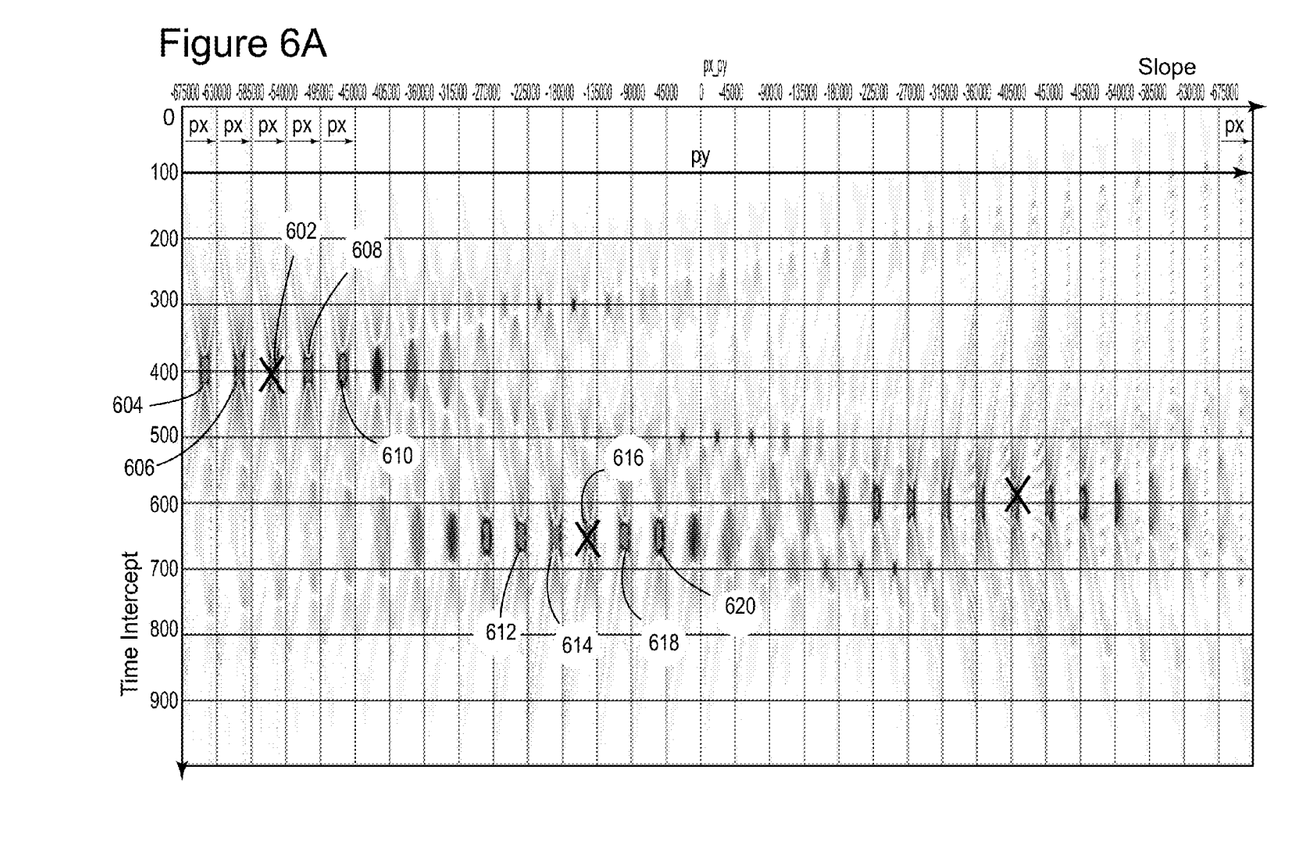
FIGS. 6A-G illustrate various steps of the flowchart of FIG. 4.

In step 404, the algorithm is initiated to perform operations to be discussed next for each window $W_k$. In step 406, a radon transform is applied to the seismic data (traces d(t, $x_i$)) of window $W_k$. FIG. 6A illustrates the full radon transformed data u(tau, px, py) corresponding to the dataset d(t, x, y) and events points 602, 604, 606, 608 and 610 correspond to the event 500 from FIG. 5. A radon transform may take the form $$u(\tau, p) = \Sigma_{i=1\ldots N} d(\tau + p \cdot x_i, x_i), \quad (3)$$

where u is the radon transform of the dataset d.

Figure 6B:
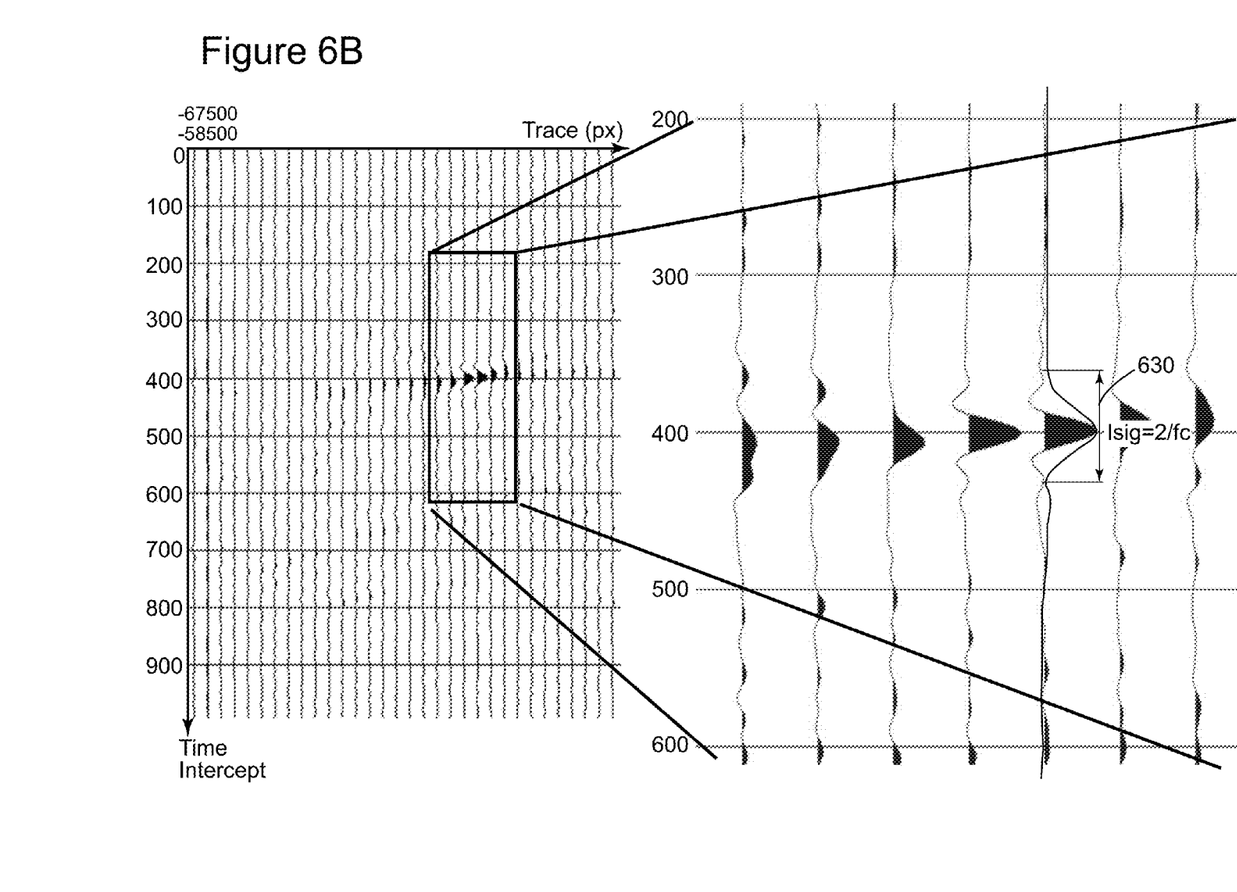
Figure 6C:
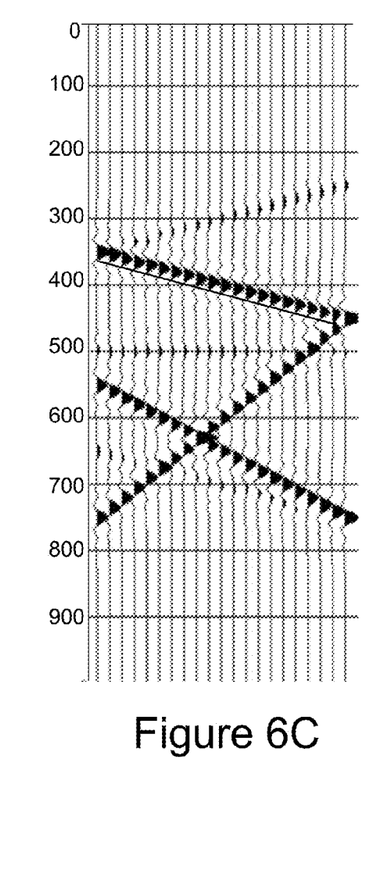
Figure 6D:
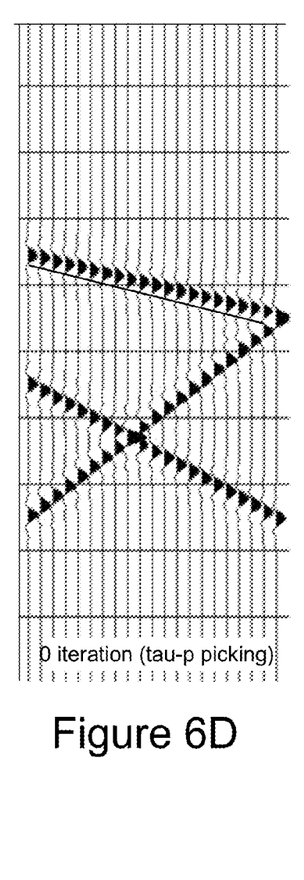
Figure 6E:
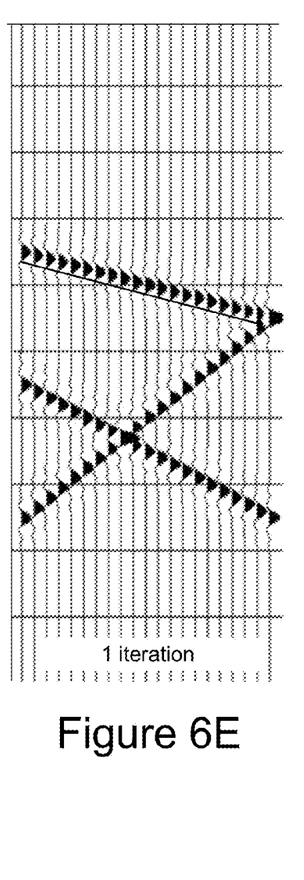
Figure 6F:
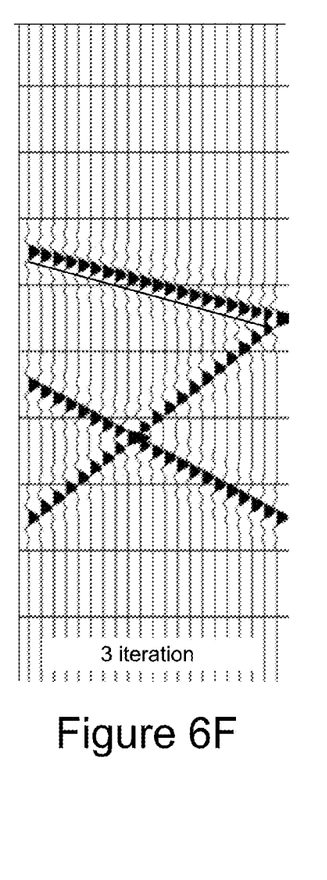

An automatic picking algorithm is applied in step 408 for picking true events. This step is performed in the radon domain. As illustrated in FIG. 6A, when the points 602-610 are considered, which belong to the same energy pattern coming from event 500, a center of this energy pattern is picked and this center corresponds to point 602. Thus, the intercept and slope 602 are picked by the picking algorithm. The same is true for point 616 and other strong patterns in the radon transform. Thus, the picking step returns a list of j=1 . . . M events that are characterized by their intercept times τ and slopes p, and also by short wavelets $S_j(t)$ directly extracted around the picking locations. FIG. 6B shows one such picked point 630. The picking step picks the events with the larger amplitude as also illustrated in FIG. 6B. However, these quantities are approximate as illustrated in FIG. 6D (FIG. 6C provides the original events for reference). Thus, a refining step 410 may be performed to optimize these quantities as illustrated in FIGS. 6E-F. The optimization step (which may include one or more iterations) provides not only better slopes and wavelets but also time-shifts $\sigma_i^j$ for each trace "i" and each event "j". This may be achieved by using a non-linear conjugate gradient algorithm on the following novel objective function:

$$(p^{(j)}, S^{(j)}, \sigma_i^{(j)}) = \arg\min(\Sigma_{i=1\ldots N} \|d(t, x_i) - \Sigma_{j=1\ldots M} S^{(j)}(t-(\tau^{(j)}+p^{(j)} \cdot x_i+\sigma_i^{(j)}))\|^2. \quad (4)$$

Thus, in the present novel method, the set of unknowns includes not only the slope and the wavelet for each event, but also the time-shift value for each trace and for each event. The objective function of equation (4) is not quadratic with respect to the time-shifts and, thus, it can suffer from local minima. Constraining the time-shifts to be smaller than, for example, the quarter-pseudoperiod of the wavelet S, may avoid this problem, i.e., avoid most, if not all, the local minima.

It is noted that equation (4) is generic because different events can have different time-shifts, even if the events arrive at the same time. This may happen for various reasons, e.g., dependency on the angle of incidence, the travel path followed in the earth, positioning inaccuracies, departures from the linear shape assumption, etc. If the time-shifts are constrained to depend on the traces only, i.e., $\sigma_i^{(j)} \to \sigma_i$, this becomes equivalent with the classical statics problem.

The slope and time intercepts may be used in the radon domain to remove, in step 412, the picked events from the initial data d. Optionally, the method may be used to remove some events, e.g., to filter out those events that have a slope larger or smaller than a predetermined slope. Thus, after removing the picked events (all or a subset of them) from the data d, the residual data r is obtained in step 412, for example, based on equation (5) as follows:

$$d'(t, x) = \Sigma_{j=1\ldots M} S^{(j)}(t-\tau^{(j)}-p^{(j)} \cdot x - \sigma^{(j)}). \quad (5)$$

Figure 6G:
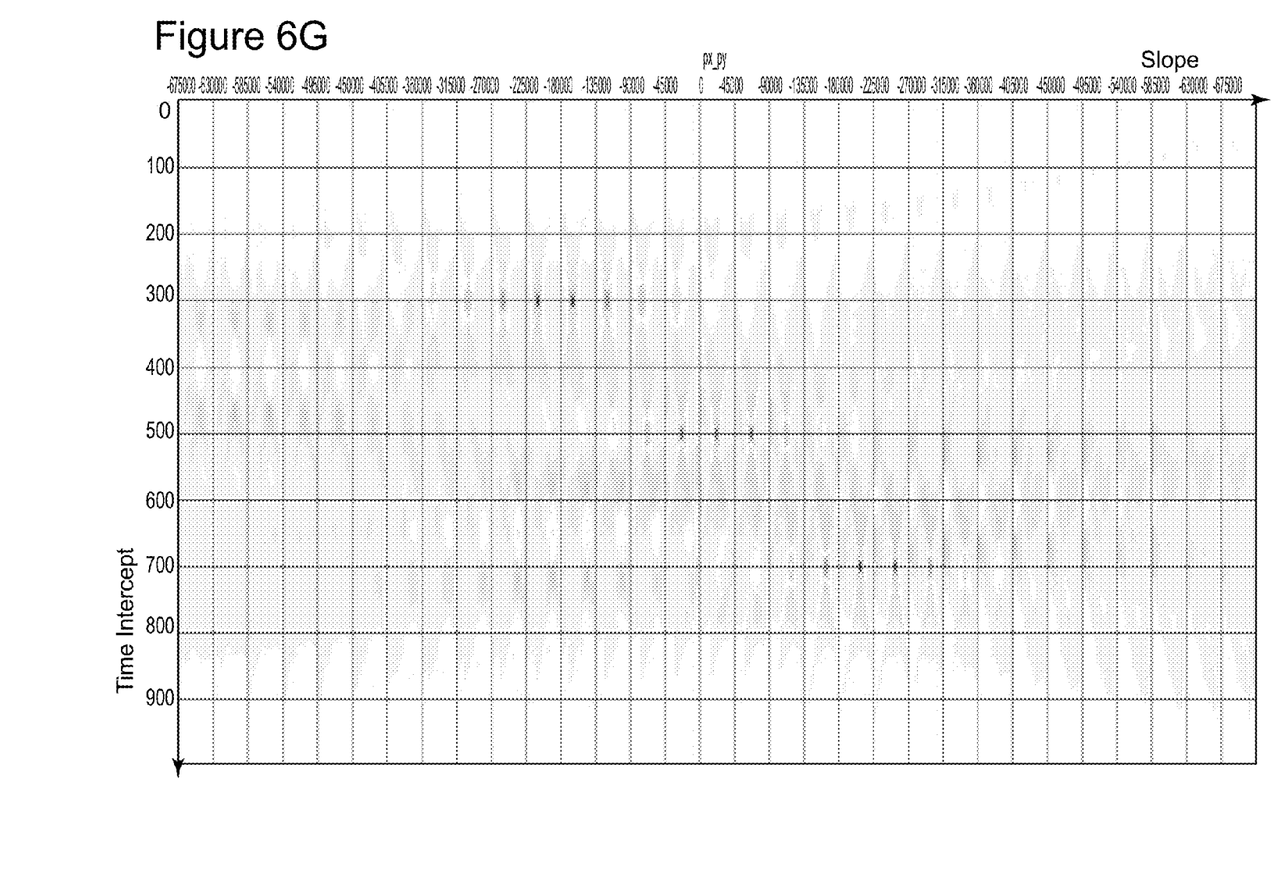

The (analytic envelop) of the Radon transform of the residual data is illustrated in FIG. 6G. A determination may be made in this step whether to further pick events and remove them. If the result of this determination is yes, then the method advances to step 418 to reiterate steps 406 to 412 for the residual data r. The algorithm advances to step 414 where it is decided whether more windows need to be processed. If the answer is yes, the algorithm returns to step 404 and processes the next window. Otherwise, the algorithm advances to step 416 in which the data from all the windows may be used for producing the final results.

Figure 7A:
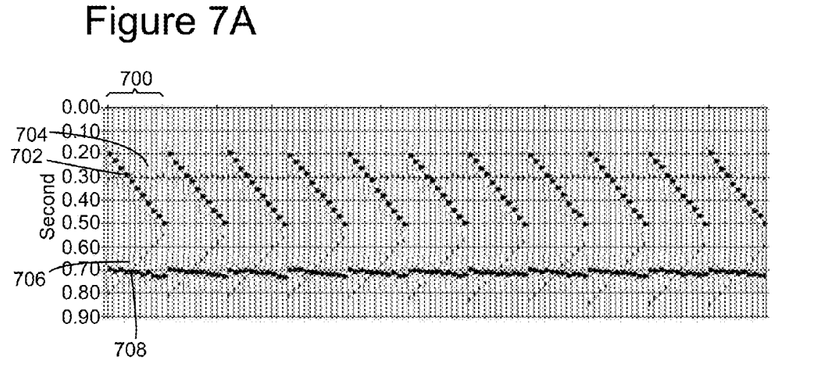
FIGS. 7A-C illustrate the application of the novel method to synthetic data according to an exemplary embodiment.
Figure 7B:
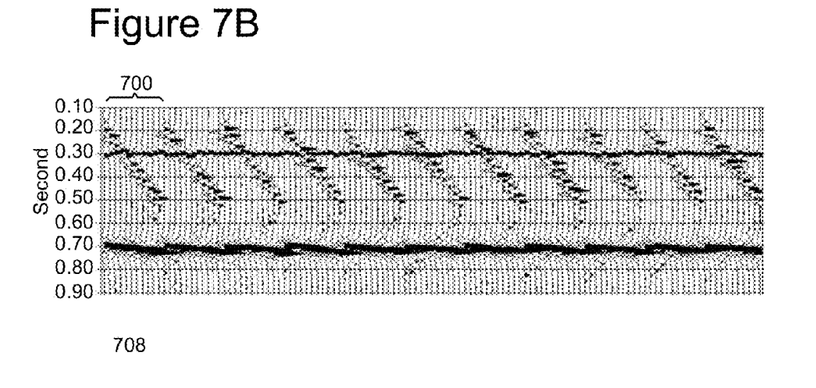

The novel method illustrated in FIG. 4 is now applied to synthetic and real data for exemplifying its advantages. The synthetic dataset is made of plural sections 700, each including 11×11 traces regularly sampled in the (t, x, y) domain as illustrated in FIG. 7A. The traces include four linear events 702, 704, 706 and 708. On each event, independent and random time-shifts have been applied, from trace to trace (+/−8 ms, for a wavelet characterized by a pseudoperiod of 36 ms). To filter out two events 702 and 706 having the highest slopes, a conventional method and a 3D version of the novel algorithm discussed above (in the t, x, y domain) are used. After the full extraction, only the events that have their estimated slopes above a given threshold are removed from the data. The results of the conventional method are illustrated in FIG. 7B (it is noted a gain +12 dB compared to FIG. 7A). It is noted that the conventional method without the time-shifts leaves significant residuals along the filtered events.

Figure 7C:
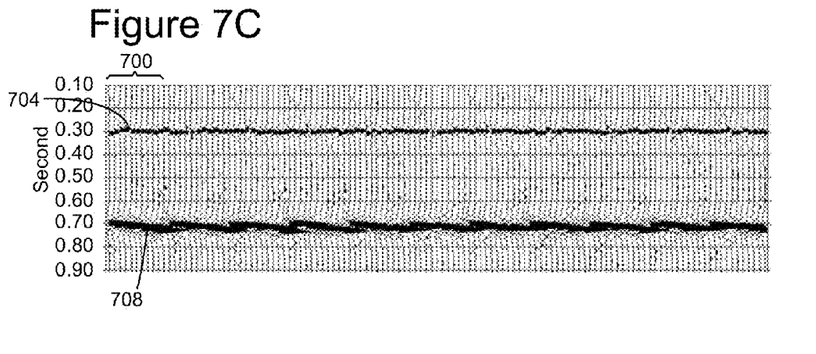

However, the novel method reduces the residuals as shown in FIG. 7C (gain +12 dB compared to FIG. 7A). The data is processed once (single processing window) with the novel method.

Figure 8A:
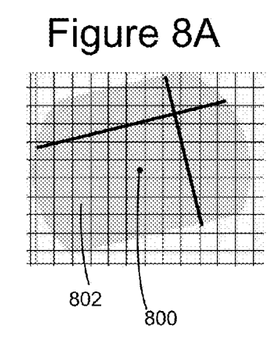
FIG. 8A illustrates a WAZ receive gather.
Figure 9A:
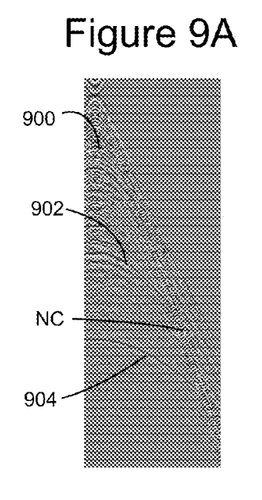
FIG. 9A illustrates a portion of the inline section of the receiver gather to be analyzed with a traditional method and the novel method.

Real data is now considered. The data includes a receiver gather from a Wide-AZimuth (WAZ) shallow water Ocean Bottom Seismic (OBS) survey. The gather is made of 36,000 shots on a 50×50 m surface grid as illustrated in FIG. 8A. FIG. 8A shows a receiver location 800 and plural shot locations 802. The maximum offset between the source and the receivers is 3,000 m. The goal is to filter out the "noise cone" NC that contains the direct arrival and some guided waves shown in FIG. 9A. It is noted that the receivers for the OBS survey extend along an inline direction and also along a cross-line direction, which is substantially perpendicular to the inline direction. The inline direction is defined as the sail line direction of the vessel towing the source.

Figure 8B:
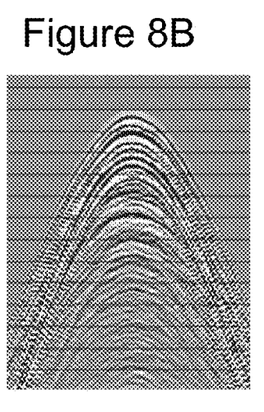
FIG. 8B illustrates an inline section of the receiver gather.
Figure 8C:
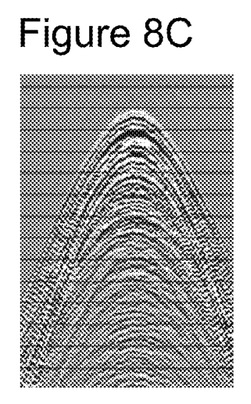
FIG. 8C illustrates a cross-line section of the receiver gather.
Figure 9B:
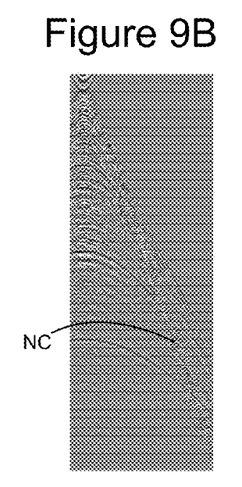
FIG. 9B illustrates events filtered without time-shifts estimation.
Figure 9C:
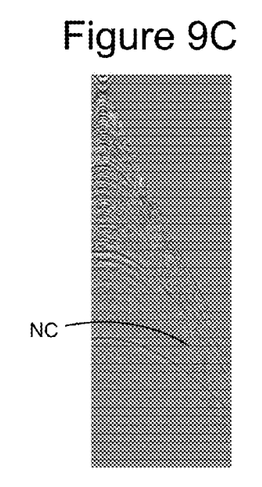
FIG. 9C illustrates events filtered with time-shifts estimation.

When analyzing the inline sections in FIG. 8B, the data appears to be smooth, but the cross-line sections in FIG. 8C appear jittery. Cold water 'statics' probably explain the jitters because two adjacent sail lines can be acquired at very different times, and the water velocity can vary significantly between them. The primary reflections are mostly unaffected because the travel-time in the water is very small (shallow water context). However, the noise that needs to be attenuated, in contrast, travels mainly in the water (or as surface waves that directly depend on the water velocity). Thus, that data includes some primary signals without time-shift perturbations, overlapped by coherent noise affected by time-shift perturbations. Because the primary signals are hardly visible on the gathers, three synthetic hyperbolae 900, 902 and 904 have been added in FIG. 9A for demonstration purposes. The comparison of the filtering on a central inline (performed in the 3D (t, x, y) domain) without time-shift estimation is shown in FIG. 9B, and with time-shift estimation is shown in FIG. 9C. FIG. 9C shows a significant improvement relative to the method in which the time-shift estimation is not applied. Note that the filtering without time-shift estimation illustrated in FIG. 9B is better on some inlines that do not suffer from cold water statics problems, and consequently the improvement brought by the time-shift estimation of FIG. 9C can vary from location to location.

The novel algorithm is able to effectively extract and/or filter out linear events that are affected by trace-to-trace time-shifts, even when the time-shifts vary from event to event, and even if the events arrive at the same times. The estimation of the time-shifts appears to be robust, and the underlying signal is well-preserved where its slopes are different enough from the slopes of the filtered noise.

The method discussed with regard to FIG. 3, without the time-shifts estimation, has several applications: random noise estimation and attenuation (the random noise being the residual data after extraction of all the coherent events); coherent linear noise attenuation (by subtracting from the data the extracted events identified as noise); spatial interpolation/regularization (by reconstructing the extracted events on arbitrary new spatial locations); accurate picking of linear events for further use in a tomography algorithm, etc.

By adding the estimation of the time-shifts (which is novel), the conceivable applications are the same as without the estimations, but they are extended to the cases where the events in the data are not perfectly linear, but suffer from (small) time-shifts from trace to trace, irrespective of the reason (e.g., residual "statics," possibly dependent on the angle of emergence of the recorded waves, "Cold water statics," positioning inaccuracies of the traces, departures from the linear shape assumption (a slightly curved event can be seen as a linear event with some time-shifts), etc.

Figure 10:
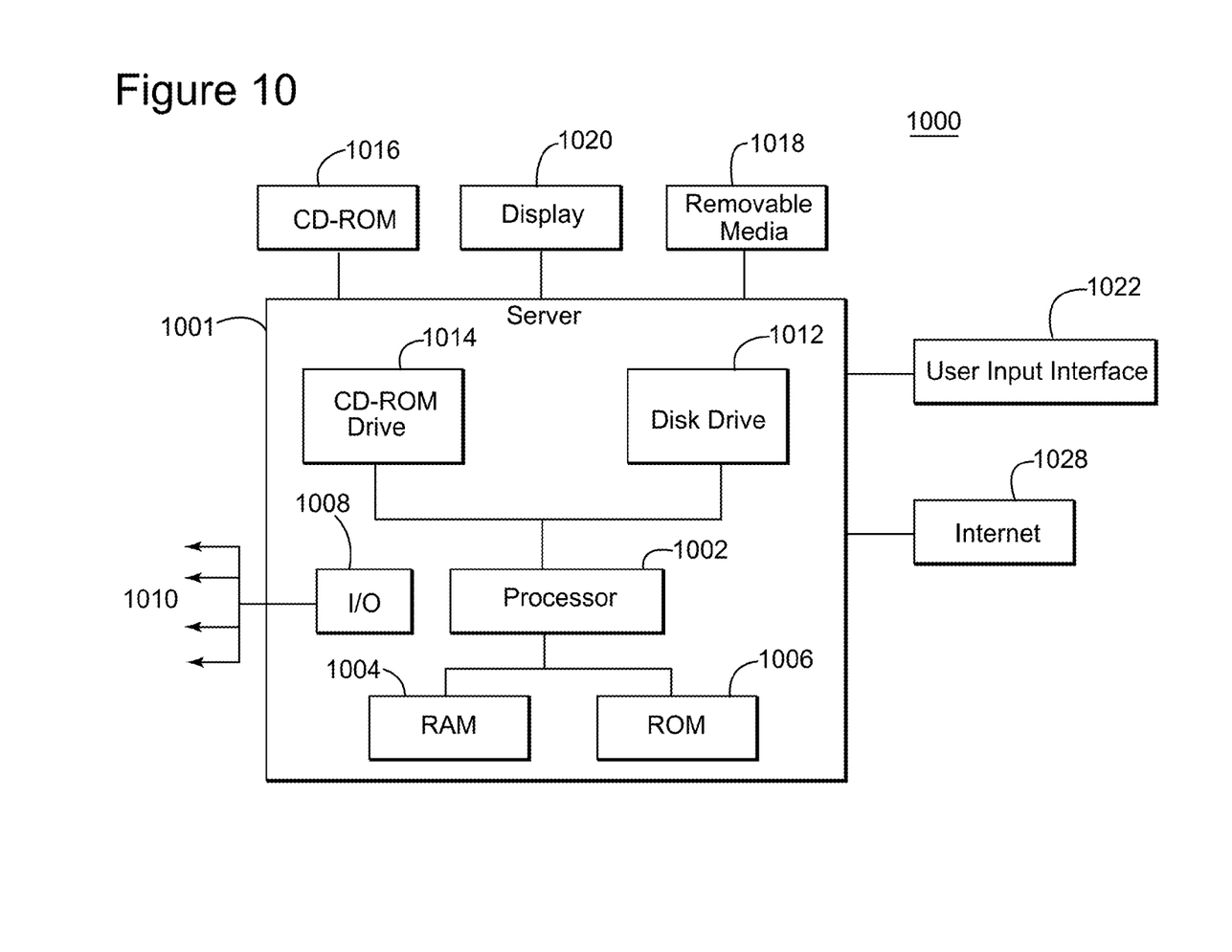
FIG. 10 is a schematic diagram of a computing device that implements one or more of the methods discussed in this application.

For purposes of illustration and not of limitation, an example of a representative computing device capable of carrying out calculations in accordance with the exemplary embodiments is illustrated in FIG. 10. Hardware, firmware, software or a combination thereof may be used to perform the various steps and operations described herein.

The exemplary computing device 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as are known in the art, as dictated by software and/or firmware instructions.

The server 1001 may also include one or more data storage devices, including hard disk drives 1012, CD-ROM/DVD drives 1014, and other hardware capable of reading and/or storing information such as DVD, etc. In one embodiment, software for carrying out the above-discussed steps may be stored and distributed on a CD-ROM 1016, portable media 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD, LED display, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as a landline and/or wireless terminals, via a network. The server may be part of a larger network configuration as in a global area network (GAN) such as the Internet 1028, which allows ultimate connection to the various landline and/or mobile client/watcher devices.

The disclosed exemplary embodiments provide a system and a method for calculating time-shifts. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for calculating time-shifts associated with travel-times of seismic waves emitted by a source and recorded by plural seismic detectors after reflection from a subsurface structure, the method comprising:
   receiving seismic data (d) that includes plural traces related to a subsurface, wherein the seismic data (d) is in a time-space domain;
   transforming with a processor the seismic data (d) from the time-space domain to a radon domain;
   picking linear events from the seismic data in the radon domain;

calculating the time-shifts associated with the picked linear events;
correcting the seismic data (d) based on the time-shifts to obtain new seismic data (d'); and
computing an image of the subsurface based on the new seismic data (d'),
wherein the time-shifts are calculated per trace and per event.

2. The method of claim 1, wherein each time-shift of the time-shifts is calculated per trace and per event.

3. The method of claim 1, further comprising:
applying an objective function for simultaneously calculating the time-shifts, slopes (p) and wavelets (S) for the seismic data, wherein the slopes (p) are radon transforms of space coordinates of the seismic data and the wavelets (S) are associated with energy amplitudes of the events.

4. The method of claim 3, wherein the objective function is given by:

$$(p^{(j)}, S^{(j)}, \sigma_i^{(j)}) = \arg\min(\Sigma_{i=1\ldots N} \|d(t, x_i) - \Sigma_{j=1\ldots M} S^{(j)} (t - (\tau^{(j)} + p^{(j)} \cdot x_i + \sigma_i^{(j)}))\|^2,$$

where $\sigma_i^{(j)}$ is a time-shift per event j and per trace i.

5. The method of claim 1, further comprising:
generating the new seismic data d' as a sum of a set of the picked events calculated at times corrected with the time-shifts.

6. The method of claim 5, wherein the new seismic data d' is calculated as:

$$d'(t, x) = \Sigma_{j=1\ldots M} S^{(j)}(t - \tau^{(j)} - p^{(j)} \cdot x - \sigma^{(j)}),$$

where $S^{(j)}$ is a wavelet associated with an event j, t is a time of the event, x is a space coordinate of the event, p is a slope of the event in the radon domain and $\sigma^{(j)}$ is a time-shift associated with the event.

7. The method of claim 1, further comprising:
removing the picked linear events from the seismic data to generate residual data (r);
radon transforming the residual data;
automatic picking further events from the residual data; and
refining slopes, wavelets, and time-shifts associated with the picked further events.

8. The method of claim 7, further comprising:
using the picked events and the further picked events to generate the image of the subsurface.

9. The method of claim 1, further comprising:
filtering out events according to predetermined criteria related to a slope (p) in the radon domain.

10. A computing device for calculating time-shifts associated with travel-times of seismic waves emitted by a source and recorded by plural seismic detectors after reflection from a subsurface structure, the computing device comprising:
an interface configured to receive seismic data (d) that includes plural traces related to a subsurface, wherein the seismic data (d) is in a time-space domain; and
a processor connected to the interface and configured to,
transform the seismic data (d) from the time-space domain to a radon domain;
pick linear events from the seismic data in the radon domain;
calculate the time-shifts associated with the picked linear events;
correct the seismic data (d) based on the time-shifts to obtain new seismic data (d'); and
compute an image of the subsurface based on the new seismic data (d'),
wherein the time-shifts are calculated per trace and per event.

11. The computing device of claim 10, wherein each time-shift of the time-shifts is calculated per trace and per event.

12. The computing device of claim 10, wherein the computing device is further configured to:
apply an objective function for simultaneously calculating the time-shifts, slopes (p) and wavelets (S) for the seismic data, wherein the slopes (p) are radon transforms of space coordinates of the seismic data and the wavelets (S) are associated with energy amplitudes of the events.

13. The computing device of claim 12, wherein the objective function is given by:

$$(p^{(j)}, S^{(j)}, \sigma_i^{(j)}) = \arg\min(\Sigma_{i=1\ldots N} \|d(t, x_i) - \Sigma_{j=1\ldots M} S^{(j)} (t - (\tau^{(j)} + p^{(j)} \cdot x_i + \sigma_i^{(j)}))\|^2,$$

where $\sigma_i^{(j)}$ is a time-shift per event j and per trace i.

14. The computing device of claim 10, wherein the new seismic data d' is calculated as:

$$d'(t, x) = \Sigma_{j=1\ldots M} S^{(j)}(t - \tau^{(j)} - p^{(j)} \cdot x - \sigma^{(j)}),$$

where $S^{(j)}$ is a wavelet associated with an event j, t is a time of the event, x is a space coordinate of the event, p is a slope of the event in the radon domain and $\sigma^{(j)}$ is a time-shift associated with the event.

15. The computing device of claim 10, wherein the computing device is further configured to:
remove the picked linear events from the seismic data to generate residual data (r);
radon transform the residual data;
automatic pick further events from the residual data; and
refine slopes, wavelets, and time-shifts associated with the picked further events.

16. The computing device of claim 15, wherein the computing device is further configured to:
use the picked events and the further picked events to generate the image of the subsurface.

17. A non-transitory computer readable medium including computer executable instructions, wherein the instructions, when executed by a processor, implement a method for calculating time-shifts associated with travel-times of seismic waves emitted by a source and recorded by plural seismic detectors after reflection from a subsurface structure, the instructions comprising steps of:
receiving seismic data (d) that includes plural traces related to a subsurface, wherein the seismic data (d) is in a time-space domain;
transforming the seismic data (d) from the time-space domain to a radon domain;
picking linear events from the seismic data in the radon domain;
calculating the time-shifts associated with the picked linear events;
correcting the seismic data (d) based on the time-shifts to obtain new seismic data (d'); and
computing an image of the subsurface based on the new seismic data (d'),
wherein the time-shifts are calculated per trace and per event.

18. The medium of claim 17, further comprising:
applying an objective function for simultaneously calculating the time-shifts, slopes (p) and wavelets (S) for the seismic data, wherein the slopes (p) are radon transforms of space coordinates of the seismic data and the wavelets (S) are associated with energy amplitudes of the events.

19. The medium of claim 18, wherein the objective function is given by:

$$(p^{(j)}, S^{(j)}, \sigma_i^{(j)}) = \arg\min(\Sigma_{i=1\ldots N} \|d(t, x_i) - \Sigma_{j=1\ldots M} S^{(j)} (t - (\tau^{(j)} + p^{(j)} \cdot x_i + \sigma_i^{(j)}))\|^2,$$

where $\sigma_i^{(j)}$ is a time-shift per event j and per trace i.

20. The medium of claim 17, wherein the new seismic data d' is calculated as:

$$d'(t,x)=\Sigma_{j=1\ldots M} S^{(j)}(t-\tau^{(j)}-p^{(j)}\cdot x-\sigma^{(j)}),$$

where $S^{(j)}$ is a wavelet associated with an event j, t is a time of the event, x is a space coordinate of the event, p is a slope of the event in the radon domain and $\sigma^{(j)}$ is a time-shift associated with the event.

\* \* \* \* \*